Feb. 17, 1931.　　　J. McDONOUGH　　　1,793,236
SCREW INSERTING AND DRIVING APPARATUS
Filed Nov. 30, 1927
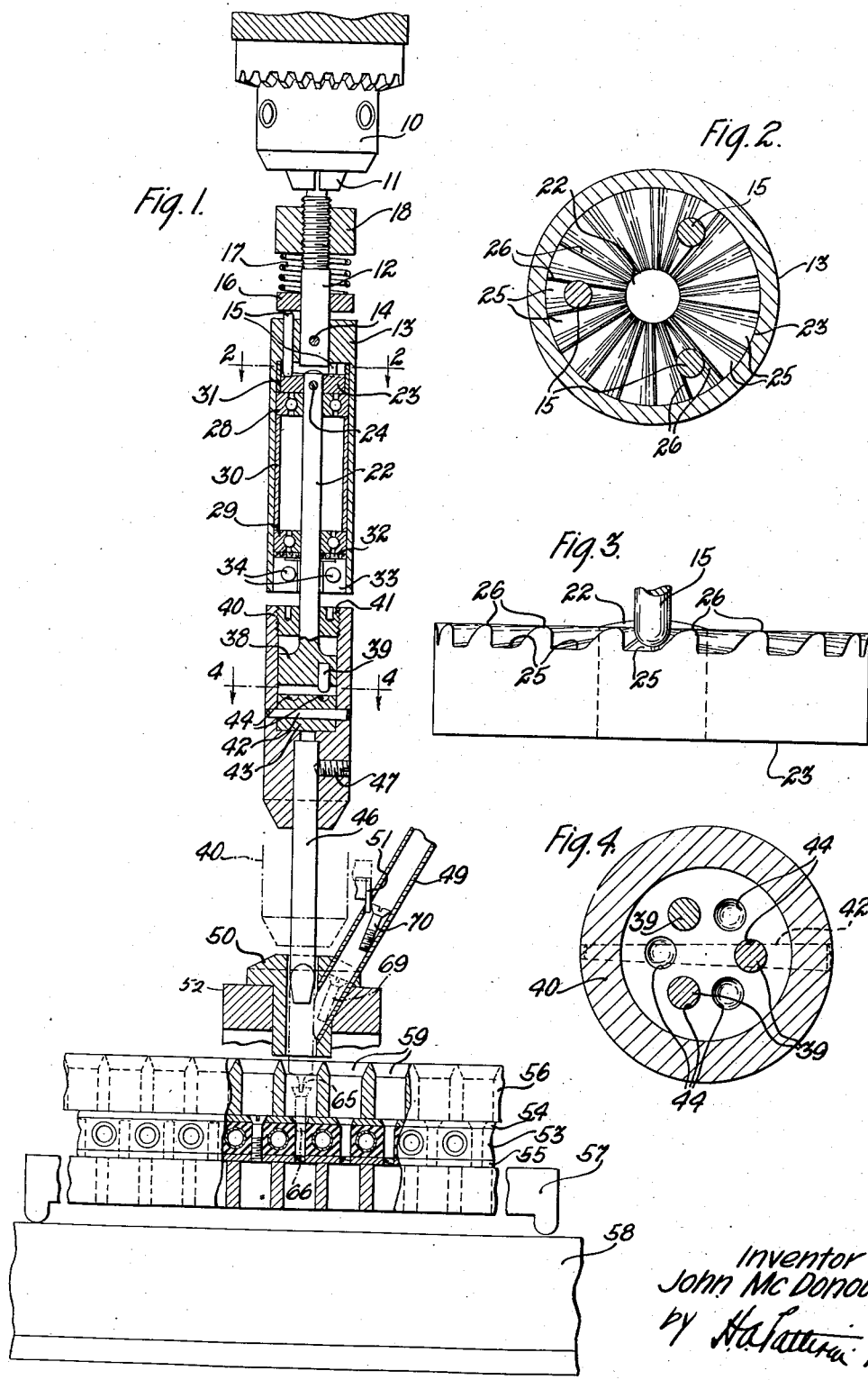
Inventor
John McDonough
by H. A. Tatum Atty Patented Feb. 17, 1931

1,793,236

UNITED STATES PATENT OFFICE

JOHN McDONOUGH, OF CHICAGO, ILLINOIS, ASSIGNOR TO WESTERN ELECTRIC COMPANY, INCORPORATED, OF NEW YORK, N. Y., A CORPORATION OF NEW YORK

SCREW-INSERTING AND DRIVING APPARATUS

Application filed November 30, 1927. Serial No. 236,685.

This invention relates to a screw inserting and driving apparatus. and more particularly to a mechanically operated device for driving screws into proper predetermined positions.

The primary object of this invention is to provide a simple, durable and efficiently operable means for automatically and expeditiously driving screws into a fixed predetermined position.

In accordance with the general features of the invention one embodiment thereof includes a screw driver supported by a frictionally driven means having therein a coupling operating to positively rotate the screw driver after the lower end thereof has become seated by force of gravity within the slot of a screw head. A cam release member serves to produce a hammering action against the threaded screw to effectively drive the screw into a proper position and to finally set the screw.

These objects and features will be apparent from the following detailed description taken in connection with the accompanying drawing, wherein Fig. 1 is a central vertical sectional view of a screw inserting and driving device which is representative of one embodiment of the invention, the lower operating position of the screw driver being shown by dot and dash lines;

Fig. 2 is a horizontal transverse sectional view of a clutch means for causing intermittent rotation and a resultant hammering action, taken on line 2—2 of Fig. 1;

Fig. 3 is a side elevational detailed view of the clutch means shown in Fig. 2 and Fig. 4 is a horizontal transverse sectional view of a coupling or driving means taken on line 4—4 of Fig. 1

Referring now to the drawing wherein like numerals have been used to designate similar parts in the various figures it will be observed that the numeral 10 designates a driving means of any suitable type with clamping jaws 11 in which is held a driving spindle 12 of a screw driver assembly. A cylindrical housing 13 is rigidly secured to the driving spindle 12 by a pin 14 passing therethrough.

Pins 15 are slidably mounted in the housing 13 and are resiliently held therein by a slidable collar 16 mounted on the spindle 12, the collar 16 being pressed downwardly by a spring 17, the pressure of which is controlled by an adjusting nut 18 threaded upon the driving spindle.

Inside of the housing 13 is an actuating spindle 22 having a collar 23 rigidly secured to the upper end thereof by a pin 24. The collar 23 has a corrugated surface with depressions 25 and crests 26 radiating from the center of the collar. The three pins 15, spaced 120° apart, are resiliently held in engagement with the corrugated surface by means of the resiliently mounted collar 16. It will be obvious that by adjustment of the nut 18 the engagement of the pins 15 may be controlled to cause the collar 23 to rotate with the pins as a unit, or to cause a relative rotation of the pins and the collar 23 and a resulting intermittent driving or hammering action on the spindle 22 which is free to move upward until striking the bottom end of the driving spindle 12.

The actuating spindle 22 is rotatably mounted in the housing 13 by a radial and thrust bearing 28 and a radial bearing 29. These bearings are maintained in proper position within the housing by means of two cylindrical spacers 30 and 31, and as before mentioned the collar 23 is free to move upwardly inside the cylindrical spacer 31. Below the radial bearing 29 is a washer 32 and a plug 33 with two pins 34 for securing the plug to the housing 13.

The spindle 22 has a cylindrical enlarged portion or flange 38 at its lower end, into which three pins 39 are firmly driven with their lower ends slightly projecting downwardly therefrom. Encircling the flange 38 is a cylindrical tool holding member 40 with a plug 41 screwed in the top end thereof, and below the flange 38 and within the tool holding member 40 is a cylindrical member 43 having depressions 44, which is rigidly secured to the member 40 by a tapered pin 42. The flange 38 of the spindle 22 is frictionally slidable within the tool holding member 40, thereby forming a frictional clutch and upon being forced downwardly relative to the member 40 of the flange 38 will positively drive the tool holding member 40 due to the engagement of the pins 39 with the member 43 in the depressions 44, the latter comprising a positive coupling. The tool holding member 40 has a screw driver blade 46 attached to its lower portion by means of a set screw 47.

A screw chute 49 directs screws downwardly into a receptacle 50, the free movement of the screws within the chute being controlled by a chute gate 51 which may be operated by any suitable means (not shown). The receptacle 50 comprises a bushing held in position by a member 52 secured to the frame of a suitable screw driver machine or drill press (not shown). The character 53 designates the material into which screws are to be threaded, consisting of telephone jacks having metallic strips 54 and 55 extending transversely of and adjacent to the jacks to which they are to be fastened. The material 53 is clamped between carriage members 56 and 57 movable upon a frame 58, and the carriage member is provided with apertures 59 for directing screws as they drop from the receptacle 50 into operative association with the material 53.

The operation of the screw inserting and driving apparatus is as follows: With the screw driver depending from the driving spindle 12, as shown, rotation is imparted thereto by means of the driving means 10 which may be driven by any suitable source of power (not shown). The screw driver holding member is thus rotated due to the frictional engagement of the peripheral surface of the flange 38 with the inner surface of member 40. By any suitable means (not shown) the driving member 10 holding the driving spindle 12 may be moved downwardly toward the work 53. Accompanying this downward movement there will be an engagement of the tip of the screw driver blade 46 with a slot 65 of a screw due to the rotation resulting from the frictional engagement of member 40 with the flange 38. It is to be noted that the frictional engagement of these two members is sufficient to cause the point of the screw driver blade to seek and mesh with the slot 65 of the screw without marring the head of the screw. As the driving means 10 and driving spindle 12 continue to move downwardly the flange 38 of the actuating spindle 22 will be moved downwardly within the member 40 until the projections 39 become seated within the depressions 44 to cause a positive driving of the tool holding member 40 and screw driver blade 46 carried thereby. With this positive driving action the screw 66 will be driven to almost its final or ultimate position in the work 53. Due to the springing action of the strips 54 and 55 an additional hammering action is required to finally set the screw, which is accomplished as follows: At this point of the operation the resistance from the turning of the screw 66 is sufficient to overcome the resilient pressure of the spring 17, thereby allowing the pins 15 to slide along the corrugated surface of the collar 23. During the downward movement of the driving means 10 the actuating spindle 22 will have been forced upwardly against the bottom of the driving spindle 12, the collar 23 being slidable within the spacer 31, as aforementioned. As the pins 15 move along the corrugated surface of collar 23 the collar will be caused to vibrate up and down due to the coaction between pins 15 and crests and depressions 25 and 26 of the collar, so as to effect a hammering action against the spindle 22 and consequently the screw driver blade 46. This hammering action will effect a final setting of the screw 66 in the springy strips 54 and 55 and thereafter the pins 15 will continue to move over the crests and depressions 25 and 26, respectively, and merely serve as a release clutch. During this movement of the pins 15, the pins 39 are still engaged in the depressions 44 of the member 43 and are not withdrawn or released therefrom until the driving means 10 is drawn upwardly by the operator. Dot and dash lines indicate a lowered position of the screw driver blade and holding member, and a screw 69, designated in dot and dash lines, is shown in a position from which it may readily be directed into an operating position as soon as the driver blade is moved upwardly by the operator. During this upward movement of the blade the carriage members 56 and 57 carrying the material 53 may be moved along the frame 58 by any suitable means (not shown) until another aperture 59 of the carrier member 56 is brought into alignment with the screw receptacle 50. The movement of the blade with respect to the movement of the material 53 may be such that the blade allows screws to fall successively into the adjacent apertures 59. Also, the gate 51 holds a screw indicated by the numeral 70 in a potential operative position while the screw driver is in the upward position.

It is thus seen from the foregoing description of one embodiment of this invention how screws may be inserted into springy material when a rotating and hammering action are both required. By employing an initial frictional driving means the screw driver is inserted within the screw slot without marring the screw head, and a positive driving means or coupling is then used to drive the screw into almost final position. At this point a hammering action is required when working on springy material or when a great resistance is encountered, and this required hammering action is provided by the described apparatus. Although the invention discloses one specific embodiment it is to be understood that the invention is not to be limited to such an embodiment but only by the scope of the appended claim.

What is claimed is:

In a rotary tool, a driving spindle, a cylindrical member secured thereto and depending therefrom, a spindle housed within the cylindrical member and being longitudinally movable therein, a collar secured to the upper end of the housed spindle and having its upper surface corrugated, a plurality of pins slidably mounted in the upper end of the cylindrical member and having their lower ends in contact with said corrugated surface of the collar, a resiliently depressed member disposed upon the aforementioned driving spindle and pressing said pins into contact with the corrugated surface, the aforementioned housed spindle having a flanged portion at its lower end, a cylindrical tool holding member frictionally engaging and depending from said flanged portion, a plurality of pins projecting from the lower surface of said flanged portion, and an engaging member having a plurality of recesses and secured to the tool holding member in a position beneath the pins for receiving the same.

In witness whereof, I hereunto subscribe my name this 18 day of November, A. D. 1927.

JOHN McDONOUGH.